US008126500B2

(12) United States Patent
Minamiguchi et al.

(10) Patent No.: US 8,126,500 B2
(45) Date of Patent: Feb. 28, 2012

(54) MOBILE COMMUNICATION APPARATUS

(75) Inventors: Tomohide Minamiguchi, Tokyo (JP); Kenji Satake, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 950 days.

(21) Appl. No.: 11/714,291

(22) Filed: Mar. 5, 2007

(65) Prior Publication Data

US 2007/0211652 A1  Sep. 13, 2007

(30) Foreign Application Priority Data

Mar. 9, 2006  (JP) .................................. 2006-64664

(51) Int. Cl.
*H04M 1/00* (2006.01)

(52) U.S. Cl. .................. 455/550.1; 455/127.2; 455/570; 455/575; 370/286; 370/289

(58) Field of Classification Search .... 455/550.1–553.1, 455/570, 575.1–575.3, 127.2, 136, 289; 704/225, 704/228, E21.002, E19.005, 338; 381/338, 381/71.1; 370/286, 289
See application file for complete search history.

(56) References Cited

U.S. PATENT DOCUMENTS

| 5,608,793 | A | * | 3/1997 | Uriya ........................ 379/406.11 |
| 5,617,450 | A | * | 4/1997 | Kakuishi et al. .............. 375/230 |
| 5,752,224 | A | * | 5/1998 | Tsutsui et al. ................ 704/225 |
| 5,909,498 | A | * | 6/1999 | Smith ........................... 381/380 |
| 6,160,893 | A | * | 12/2000 | Saunders et al. ............. 381/71.6 |
| 6,359,984 | B1 | * | 3/2002 | Kim .......................... 379/433.02 |
| 6,766,176 | B1 | * | 7/2004 | Gupta et al. ................ 455/550.1 |
| 6,795,494 | B1 | * | 9/2004 | Phanse et al. ................. 375/219 |
| 6,975,674 | B1 | * | 12/2005 | Phanse et al. ................. 375/219 |
| 6,980,644 | B1 | * | 12/2005 | Sallaway et al. .............. 379/391 |
| 6,987,992 | B2 | * | 1/2006 | Hundal et al. ............. 455/569.1 |
| 6,993,366 | B2 | * | 1/2006 | Kim .......................... 455/569.1 |
| 7,245,891 | B2 | * | 7/2007 | Hugunin ....................... 455/148 |

(Continued)

FOREIGN PATENT DOCUMENTS

JP  62020407 A  *  1/1987

(Continued)

OTHER PUBLICATIONS

Japanese Office Action dated Apr. 23, 2010 and English translation thereof in counterpart Japanese Application No. 2006-064664.

*Primary Examiner* — Marivelisse Santiago Cordero
*Assistant Examiner* — Marisol Fahnert
(74) *Attorney, Agent, or Firm* — Maschoff Gilmore & Israelsen

(57) ABSTRACT

A mobile communication apparatus usable for voice communication exchanging a received sound and a spoken sound is provided. The mobile communication apparatus includes a first section, a second section movably connected to the first section in an ordinary mechanical mode or an extra mechanical mode, a detector configured to detect the mechanical mode, a speaker included in the first section and configured to produce the received sound, and a microphone included in the second section and configured to pick up the spoken sound. The mobile communication apparatus includes an echo canceller configured to cancel an echo caused by leakage of the received sound, an AGC circuit configured to produce a gain-controlled signal, and a controller configured to provide the AGC circuit with a first input/output characteristic and a second input/output characteristic in the ordinary mechanical mode and in the extra mechanical mode, respectively.

10 Claims, 12 Drawing Sheets

U.S. PATENT DOCUMENTS

| | | | |
|---|---|---|---|
| 7,386,285 B2* | 6/2008 | Yamauchi | 455/136 |
| 7,403,611 B1* | 7/2008 | He et al. | 379/420.01 |
| 7,489,911 B2* | 2/2009 | Zylowski | 455/130 |
| 7,532,717 B2* | 5/2009 | Nishimura | 379/406.01 |
| 7,623,672 B2* | 11/2009 | Wu et al. | 381/357 |
| 7,660,425 B1* | 2/2010 | Reed et al. | 381/66 |
| 2003/0223434 A1* | 12/2003 | Hwang et al. | 370/395.62 |
| 2004/0209656 A1* | 10/2004 | Kitami et al. | 455/569.1 |
| 2005/0058278 A1* | 3/2005 | Gallego Hugas et al. | 379/406.01 |
| 2006/0060762 A1* | 3/2006 | Chan et al. | 250/221 |
| 2006/0067543 A1* | 3/2006 | Katayama | 381/104 |
| 2006/0142070 A1* | 6/2006 | Park | 455/569.1 |
| 2006/0258414 A1* | 11/2006 | Vance et al. | 455/575.7 |
| 2006/0270468 A1* | 11/2006 | Hui et al. | 455/570 |
| 2007/0087793 A1* | 4/2007 | Noma et al. | 455/575.3 |

FOREIGN PATENT DOCUMENTS

| | | |
|---|---|---|
| JP | 2003-18267 A | 1/2003 |
| JP | 2003-198715 A | 7/2003 |
| JP | 2003-273989 A | 9/2003 |
| JP | 2003-289354 A | 10/2003 |
| JP | 2005-354355 A | 12/2005 |

* cited by examiner

MOBILE COMMUNICATION APPARATUS

CROSS REFERENCE TO RELATED APPLICATIONS

This application is based upon and claims the benefit of priority from the prior Japanese Patent Application No. 2006-064664 filed on Mar. 9, 2006; the entire contents of which are incorporated herein by reference.

FIELD OF THE INVENTION

The present invention relates to a mobile communication apparatus, and in particular to one capable of echo cancellation.

DESCRIPTION OF THE BACKGROUND

A clamshell mobile phone is disclosed in Japanese Patent Publication (Kokai), No. 2003-018267, which has two sections movably connected to each other, and may be used for voice communication no matter whether the two sections are open or closed to each other.

The above clamshell mobile phone has a mouthpiece 3, a first earpiece 4 and a second earpiece 5. The mouthpiece 3 and the first earpiece 4 may be used for voice communication while the two sections are being open (called an open mode). The mouthpiece 3 and the second earpiece 5 may be used for voice communication while the two sections are being closed (called a closed mode). In the closed mode, however, the first earpiece 4 for the open mode comes close to the mouthpiece 3, thereby may easily cause echoes.

So as to avoid the echoes by a mechanical means, the above clamshell mobile phone has a sound blocker 3b positioned, in the closed mode, between the mouthpiece 3 and the first earpiece 4 for the open mode. Besides, the clamshell mobile phone is configured, in the closed mode, so that a sound leaks from the first earpiece 4 in a direction "A" which is different from a direction "B" of the mouthpiece 3, as shown in FIG. 2 of the above Kokai reference.

So as to avoid the echoes by an electrical means, the above clamshell mobile phone may detect the mode, either open or closed. The clamshell mobile phone is configured to provide, in the open mode, only the first earpiece 4 for the open mode with sound signals. The clamshell mobile phone is configured to provide, in the closed mode, only the second earpiece 5 for the closed mode with sound signals.

The above clamshell mobile phone may hardly make echoes while being used for voice communication in the open mode, as the mouthpiece 3 and the first earpiece 4 are well separated in the open mode.

The above clamshell mobile phone may make echoes more easily while being used for voice communication in the closed mode than in the open mode, as separation between the mouthpiece 3 and the second earpiece 5 in the closed mode is not as large as separation between the mouthpiece 3 and the first earpiece 4 in the open mode. No attention seems to be paid in the above Kokai reference, however, to echoes possibly occurring between the mouthpiece 3 and the second earpiece 5 in the closed mode.

SUMMARY OF THE INVENTION

Accordingly, an advantage of the present invention is to provide a mobile communication apparatus having no less than two sections movably connected to each other by using any available mechanism, shifting between a mechanical mode for ordinary use and another mechanical mode for extra use, and being capable of suitable echo cancellation while being used for voice communication in each of the above mechanical modes.

To achieve the above advantage, one aspect of the present invention is to provide a mobile communication apparatus usable for voice communication exchanging a received sound and a spoken sound. The mobile communication apparatus includes a first section, a second section movably connected to the first section in at least one of an ordinary mechanical mode and an extra mechanical mode, a detector configured to detect one of the ordinary mechanical mode and the extra mechanical mode, a speaker included in the first section and configured to produce the received sound, and a microphone included in the second section and configured to pick up the spoken sound. The mobile communication apparatus includes an echo canceller configured to cancel an echo caused by leakage of the received sound into the microphone upon being provided with a signal of the received sound and a signal of the spoken sound, an AGC circuit configured to produce a gain-controlled signal upon being provided with an echo-cancelled signal by the echo canceller, and a controller configured to provide the AGC circuit with a first input/output characteristic and a second input/output characteristic in the ordinary mechanical mode and in the extra mechanical mode, respectively.

DETAILED DESCRIPTION OF THE INVENTION

A first embodiment of the present invention will be described with reference to FIGS. 1-5, as to a mobile communication apparatus configured to be used for voice communication in each of an ordinary mechanical mode and an extra mechanical mode. These mechanical modes will be specifically described later.

The mobile communication apparatus of the first embodiment is configured to change an input/output (I/O) characteristic of automatic gain control (AGC). The mobile communication apparatus of the first embodiment has a mouthpiece, i.e., a microphone, provided for the ordinary mechanical mode and another mouthpiece provided for the extra mechanical mode. The mobile communication apparatus of the first embodiment has an earpiece, i.e., a speaker, provided for both the ordinary mechanical mode and the extra mechanical mode.

Figure 1:
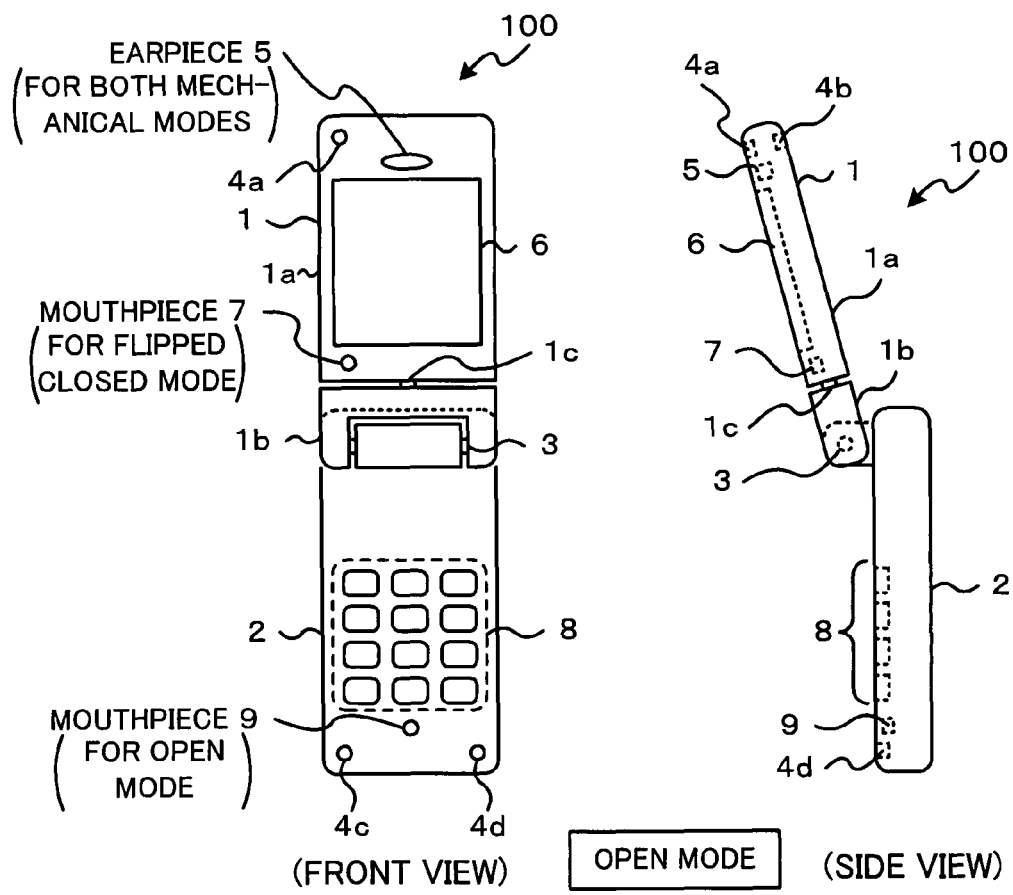
FIG. 1 shows an external view of a mobile communication apparatus of a first embodiment of the present invention in an open (ordinary mechanical) mode.

FIG. 1 shows an external view of a mobile communication apparatus 100 of the first embodiment, being in the ordinary mechanical mode for ordinary voice communication. As two main sections of the mobile communication apparatus 100 are open two each other, the ordinary mechanical mode shown in FIG. 1 may be called an open mode.

Figure 2:
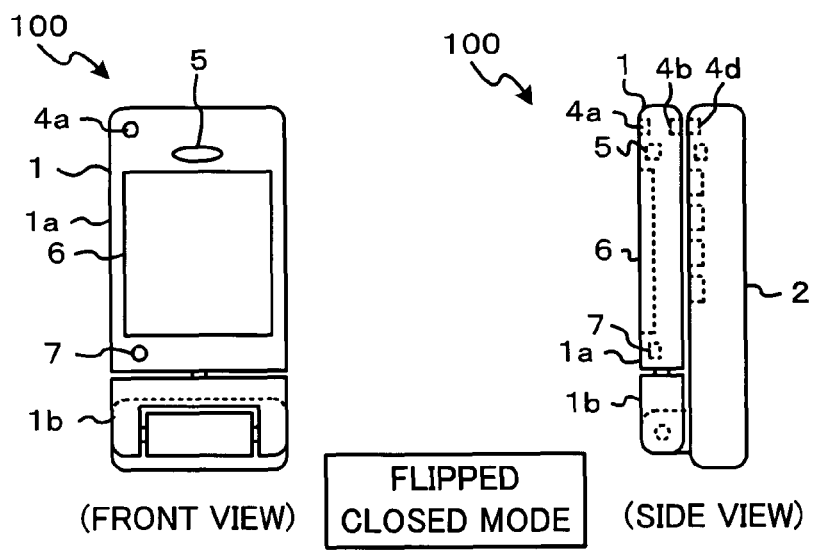
FIG. 2 shows an external view of the mobile communication apparatus of the first embodiment in a flipped closed (extra mechanical) mode.

FIG. 2 shows an external view of the mobile communication apparatus 100, being in the extra mechanical mode for extra (i.e., other than ordinary) voice communication. As one of the two main sections has been flipped over and closed to another of them, the extra mechanical mode shown in FIG. 2 may be called a flipped closed mode.

The mobile communication apparatus 100 features a double swivel action by including and using a dual-axis hinge structure. The mobile communication apparatus 100 includes an upper section 1 and a lower section 2 which are, to each other, foldably connected around a hinge 3. The upper section 1 includes a subsection 1a and a subsection 1b which are, to each other, rotationally connected around a hinge 1c.

The subsection 1a of the upper section 1 has detection targets (magnets) 4a and 4b, an earpiece 5, a display 6 and a mouthpiece 7. The lower section 2 has detectors (Hall sensors) 4c and 4d, user controls 8 including a plurality of key switches, and a mouthpiece 9.

The mobile communication apparatus 100 may shift from the open mode shown in FIG. 1 to the flipped closed mode shown in FIG. 2 by flipping over the subsection 1a around the hinge 1c and by closing the upper section 1 to the lower section 2 around the hinge 3. In the flipped closed mode, the display 6, the mouthpiece 7 and the earpiece 5 are exposed outwards. Meanwhile, the detector (Hall sensor) 4d detects the detection target (magnet) 4b coming close to the detector 4d so that the flipped closed mode is detected.

If neither the detector 4c nor the detector 4d detects the detection target 4a or the detection target 4b, the open mode is detected.

In the open mode, the mouthpiece 9 and the earpiece 5 are used for voice communication as a human audio interface. Voice communication is also available in the flipped closed mode, where the mouthpiece 7 and the earpiece 5 are used as a human audio interface. The earpiece 5 may be used for voice communication both in the open mode and in the flipped closed mode.

Assume that a spoken sound, or a spoken voice, is produced close to the mouthpiece 9 or the mouthpiece 7 in a voice communication session between a user of the mobile communication apparatus 100 and a partner of the session. The spoken sound, being loud enough, may then be picked up by the mouthpiece 9 or the mouthpiece 7. Meanwhile, the earpiece 5 may produce a received sound, or a received voice, which may be conducted to and picked up by the mouthpiece 9 or the mouthpiece 7.

In the open mode, the received sound may be conducted along an acoustic path formed by space and a housing portion between the earpiece 5 and the mouthpiece 9. In the flipped closed mode, the received sound may be conducted along an acoustic path formed by space and a housing portion between the earpiece 5 and the mouthpiece 7.

As the acoustic path between the earpiece 5 and the mouthpiece 7 is shorter than the acoustic path between the earpiece 5 and the mouthpiece 9, amplitude of the received sound picked up by the mouthpiece 7 in the flipped closed mode may be greater than amplitude of the received sound picked up by the mouthpiece 9 in the open mode.

The received sound picked up by the mouthpiece 9 or the mouthpiece 7, if being sent to the partner of the session without being processed, may be observed as an echo by the partner just as the partner has talked. Such an echo may be cancelled according to the present invention as described hereafter.

Figure 3:
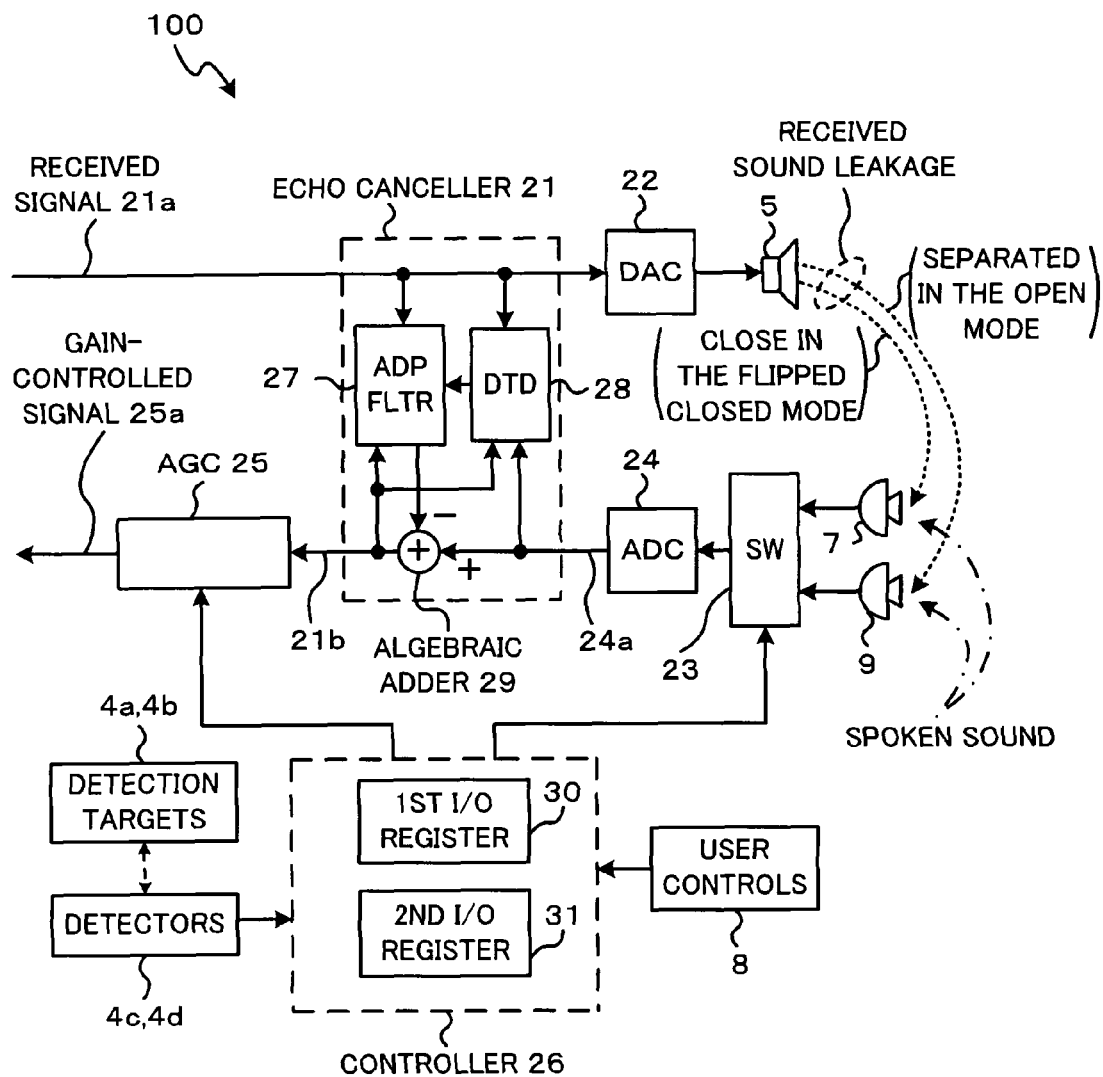
FIG. 3 is a block diagram of a main portion of the mobile communication apparatus of the first embodiment.

FIG. 3 is a block diagram of a main portion of the mobile communication apparatus 100 that has been mechanically shown in FIG. 1 and FIG. 2. In FIG. 3, shown are the detection targets 4a and 4b, the detectors 4c and 4d, the earpiece 5, the user controls 8 and the mouthpieces 7 and 9 which are shown in FIG. 1 or FIG. 2.

As shown in FIG. 3, the mobile communication apparatus 100 further includes an echo canceller 21, a digital-to-analog converter (DAC) 22, a switch 23, an analog-to-digital converter (ADC) 24, an automatic gain control circuit (AGC) 25 and a controller 26. The echo canceller 21 includes an adaptive filter 27, a double-talk detector (DTD) 28, and an algebraic adder 29. The controller 26 includes a first I/O register 30 and a second I/O register 31, which will be explained later.

In FIG. 3, shown is a received signal 21a representing a received sound of the partner of the voice communication session and has been demodulated by a demodulator (not shown) of the mobile communication apparatus 100.

In FIG. 3, shown is a gain-controlled signal 25a representing a spoken sound of the user of the mobile communication apparatus 100, and will be provided to a modulator (not shown) of the mobile communication apparatus 100 so as to be sent to the partner.

The received signal 21a may be converted into analog form by the DAC 22, provided to the earpiece 5, and produced by the earpiece 5 as the received sound that reaches an ear of the user of the mobile communication apparatus 100.

A signal path of the spoken sound of the user of the mobile communication apparatus 100 starts from the mouthpiece 9 or the mouthpiece 7, and then runs through the switch 23, the ADC 24, the echo canceller 21 and the AGC 25. At first, the spoken sound is converted into electrical form by the mouthpiece 9 or the mouthpiece 7.

Either one of signals of the spoken sound, starting from the mouthpiece 9 or from the mouthpiece 7, may be selected by the switch 23 and then provided to the ADC 24. The signal of the spoken sound is converted into digital form by the ADC 24, and then provided to the echo canceller 21.

While reaching the ear of the user of the mobile communication apparatus 100, the received sound produced by the earpiece 5 may be conducted to and picked up by, i.e., may leak into the mouthpiece 9 or the mouthpiece 7. Above leakage of the received sound, if being sent to the partner of the session without being processed, may be observed as an echo by the partner just as the partner has talked.

So as to cancel the echo, the DTD 28 of the echo canceller 21 may detect a sound level included in the received signal 21a representing the received sound, and a sound level of a signal 24a provided by the ADC 24 and representing the spoken sound.

The adaptive filter 27 may estimate an echo path and provide the algebraic adder 29 with a pseudo echo signal. The algebraic adder 29 may cancel the leakage of the received sound, i.e., cancel the echo, by subtracting the pseudo echo signal from the signal 24a representing the spoken sound overlapped by the leakage. The algebraic adder 29 thereby may provide the AGC 25 with an echo-cancelled signal 21b representing an echo-cancelled spoken sound which should be primarily sent to the partner.

In the open mode, the earpiece 5 and the mouthpiece 9 may be so separated that a level of the above leakage is not very significant, and that the echo canceller 21 may satisfactorily cancel the echo.

In the flipped closed mode, though, the earpiece 5 and the mouthpiece 7 may be so close that the leakage level is significant, and that the echo canceller 21 may not satisfactorily reduce the leakage. The echo-cancelled signal 21b provided by the echo canceller 21 may consequently include a residual echo component.

The AGC 25 may output the gain-controlled signal 25a having a level corresponding to a level of the echo-cancelled signal 21b according to one of I/O characteristics provided by the controller 26. The controller 26 has the first I/O register 30 and the second I/O register 31, each storing data of the I/O characteristics to be provided to the AGC 25. The above I/O characteristics will be explained later.

The controller 26 may include a central processing unit (CPU), a program read only memory (ROM), a working random access memory (RAM) and an I/O interface, which are not shown.

If the open mode is detected, the controller 26 provides the AGC 25 with a first I/O characteristic stored in the first I/O register 30. If the flipped closed mode is detected, the controller 26 provides the AGC 25 with a second I/O characteristic stored in the second I/O register 31.

The controller 26 may select a changeover of the switch 23 and may select one of the I/O characteristics provided to the AGC 25 based on an operation mode selected on the user controls 8, etc., which will be explained later.

The first I/O register 30 may not be included in the controller 26, but may be included in the AGC 25, instead. The second I/O register 31 may not be included in the controller 26, but may be included in the AGC 25, instead. The AGC 25 and the controller 26 may properly share an AGC function of the mobile communication apparatus 100.

Figure 4:
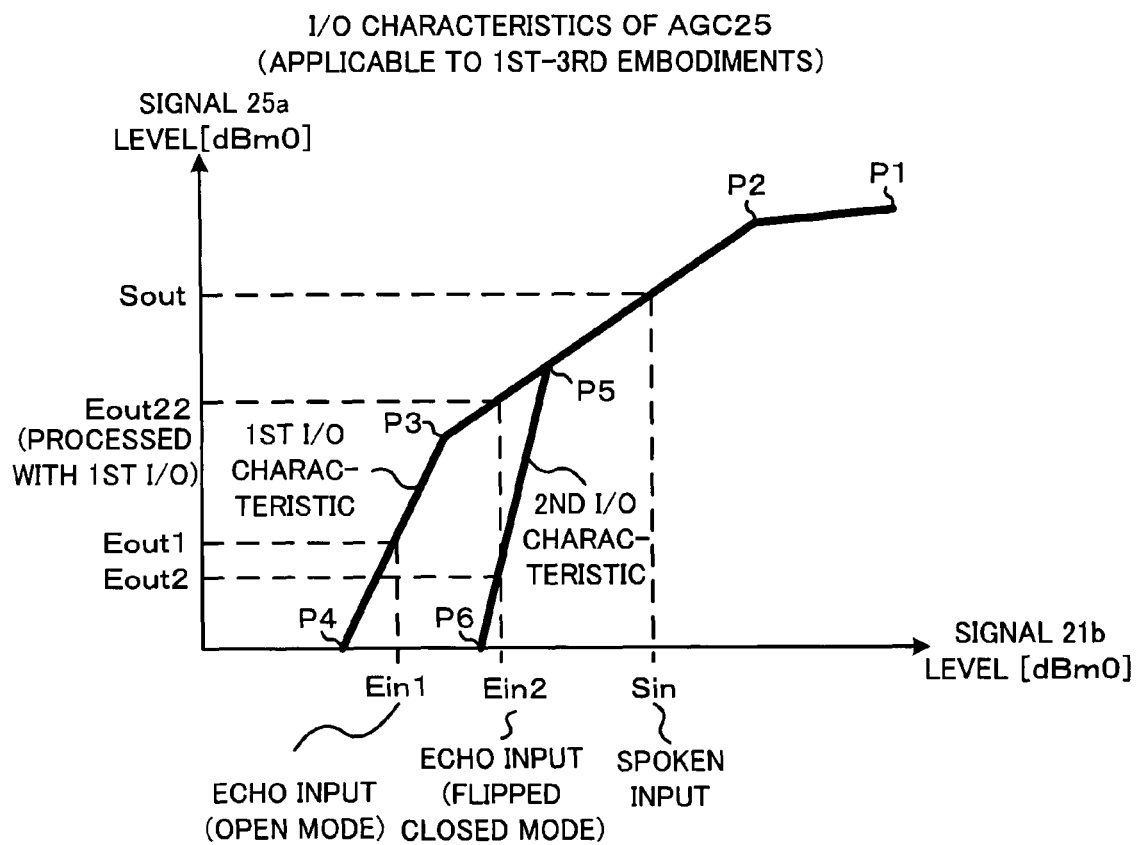
FIG. 4 illustrates I/O characteristics of an AGC function of the mobile communication apparatus of the first embodiment.

FIG. 4 illustrates the I/O characteristics of the AGC function of the mobile communication apparatus 100 of the first embodiment. The I/O characteristics shown in FIG. 4 may also be applied to following (second and third) embodiments of the present invention as described later.

In FIG. 4, there are a horizontal axis representing a level of the echo-cancelled signal 21b provided by the echo canceller 21 to the AGC 25 in dBm0, and a vertical axis representing a level of the gain-controlled signal 25a provided by the AGC 25 in dBm0. In FIG. 4, shown are bold solid lines representing the I/O characteristics.

The first I/O register 30 of the controller 26 stores data of the first I/O characteristic formed by a series of line segments P1-P2-P3-P4. The second I/O register 31 of the controller 26 stores data of the second I/O characteristic formed by a series of line segments P1-P2-P5-P6.

As shown in FIG. 4, in a range of relatively lower values on the horizontal axis, the level of the gain-controlled signal 25a of the second I/O characteristic is lower than that of the first I/O characteristic. The AGC 25 produces the gain-controlled signal 25a having a level corresponding to a level of the echo-cancelled signal 21b according to the first I/O characteristic or the second I/O characteristic provided by the controller 26.

The echo-cancelled signal 21b provided by the echo canceller 21 and represented by the horizontal axis in FIG. 4 has a feature as described below. In the open mode, the leakage level may not be very significant, and the echo may be satisfactorily cancelled by the echo canceller 21.

A residual echo component of the echo-cancelled signal 21b (called echo input) may have been reduced, e.g., to a level "Ein1" as shown in FIG. 4. In contrast, a spoken sound component of the echo-cancelled signal 21b (called spoken input) has a level being as great as, e.g., "Sin" as shown in FIG. 4.

On the I/O characteristics shown in FIG. 4, the spoken input corresponds to a spoken sound component of the gain-controlled signal 25a (called spoken output). The echo input corresponds to an echo component of the gain-controlled signal 25a (called echo output).

In the flipped closed mode, the leakage level may be significant, and the echo may not be satisfactorily cancelled by the echo canceller 21. The echo input may remain, e.g., around a level "Ein2" as shown in FIG. 4. The spoken input may have the level being as great as, e.g., "Sin" as shown in FIG. 4. Although possibly having a level not as great as "Sin", the spoken input generally has a level greater than a level of the echo input.

The controller 26 follows an algorithm that either the first I/O characteristic or the second I/O characteristic of the AGC function is selected according to the mechanical modes of the mobile communication apparatus 100.

In the open mode, the controller 26 selects the first I/O characteristic. As shown in FIG. 4, the spoken output corresponding to the level of the spoken input "Sin" has a level "Sout", and the echo output corresponding to the level of the echo input "Ein1" has a level "Eout1". As the level "Eout1" is much smaller than the level "Sout", the echo may be satisfactorily cancelled by the AGC function in the open mode.

In the flipped closed mode, the controller 26 selects the second I/O characteristic. As shown in FIG. 4, the echo output corresponding to the level of the echo input "Ein2" has a level "Eout2". As the level "Eout2" is much smaller than the level "Sout", the echo may be satisfactorily cancelled by the AGC function in the flipped closed mode.

Assume that the controller 26 only stores the data of the first I/O characteristic without regard to the mechanical mode of the mobile communication apparatus 100. The AGC 25 would produce the echo output having a level "Eout22" upon being provided with the echo input "Ein2" in the flipped closed mode, as shown in FIG. 4. As a difference between the level "Eout22" and the level "Sout" is not very great, in the above assumption, the echo could not be satisfactorily cancelled by the AGC function in the flipped closed mode.

In contrast, as the controller 26 of the present invention applies the second I/O characteristic to the echo input having the level as great as "Ein2" in the flipped closed mode, the echo may be effectively cancelled to the level as small as "Eout2".

Each of the I/O characteristics shown in FIG. 4 may not be the series of line segments, P1-P2-P3-P4 or P1-P2-P5-P6, but may be a curved line instead.

Figure 5:
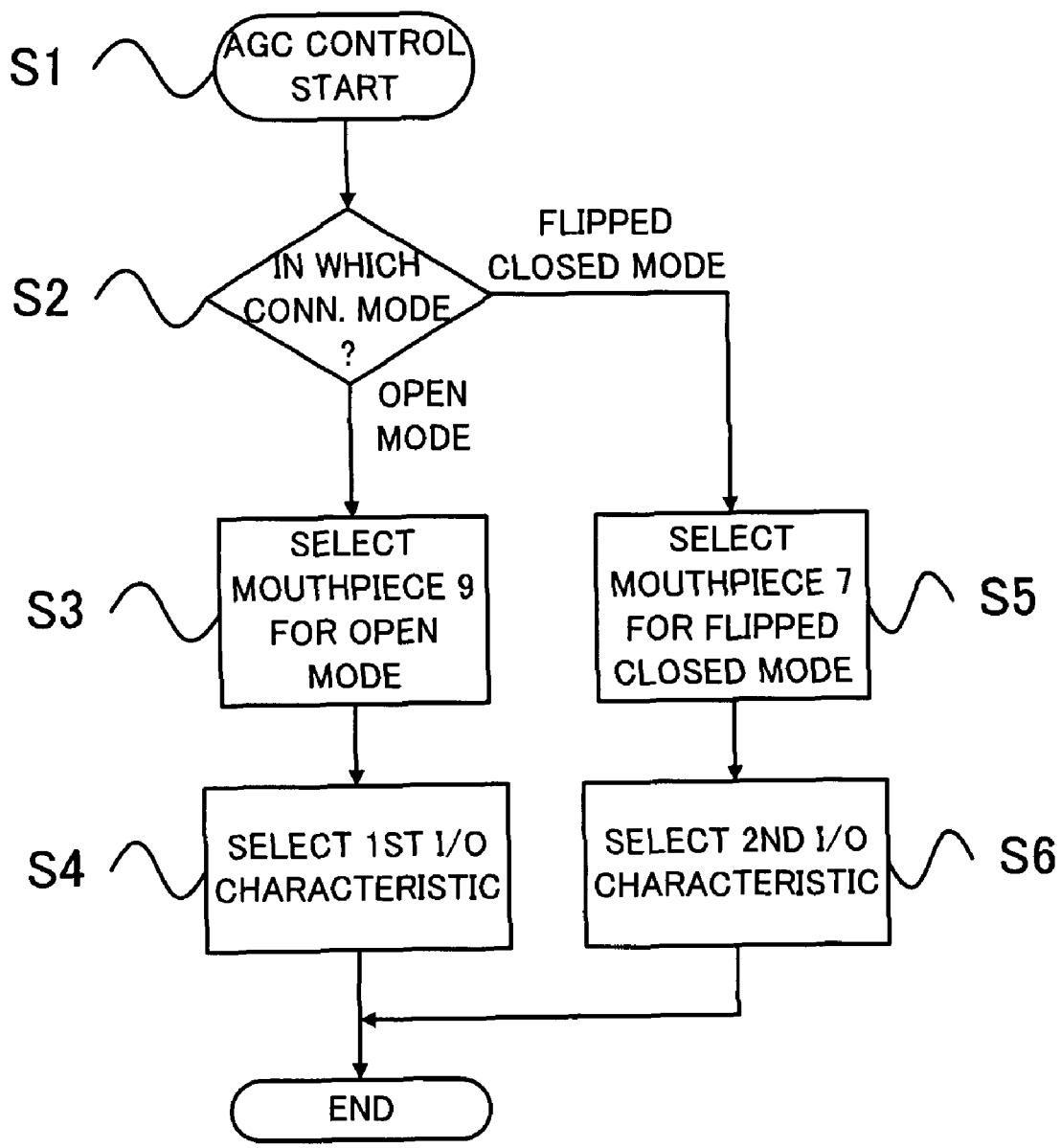
FIG. 5 is a flow chart of operation of a controller included in the mobile communication apparatus of the first embodiment.

FIG. 5 is a flow chart of operation of the controller 26 included in the mobile communication apparatus 100 of the first embodiment. The flow chart of FIG. 5 is drawn exactly according to the algorithm having been explained with reference to FIG. 4.

After starting AGC control operation (step S1), the controller 26 checks if the mobile communication apparatus 100 is in the open mode or in the flipped closed mode by checking status of the detectors 4c and 4d (step S2).

In the open mode, the controller 26 selects the mouthpiece 9 by selecting the changeover of the switch 23 (step S3), as the mouthpiece 9 and the earpiece 5 are used for voice communication in the open mode. The controller 26 then provides the AGC 25 with the first I/O characteristic (step S4).

In the flipped closed mode, the controller 26 selects the mouthpiece 7 by selecting the changeover of the switch 23 (step S5), as the mouthpiece 7 and the earpiece 5 are used for voice communication in the flipped closed mode. The controller 26 then provides the AGC 25 with the second I/O characteristic (step S6).

According to the first embodiment of the present invention described above, the mobile communication apparatus 100 that may be used for voice communication in the plural mechanical modes includes the AGC 25 following the echo canceller 21 on the signal path of the spoken sound. The AGC 25 may be selectively provided with one of the plural I/O characteristics according to one of the mechanical modes so that the echo may be effectively cancelled.

A second embodiment of the present invention and a modified one thereof will be described with reference to FIGS. 6-13, as to a mobile communication apparatus configured to be used for voice communication in each of different two mechanical modes, and configured to select an I/O characteristic of AGC.

The mobile communication apparatus of the second embodiment is configured to be provided with a combination of an earpiece and a mouthpiece to be used for voice communication in each of the mechanical modes in a manner different from that of the first embodiment.

That is, the mobile communication apparatus of the second embodiment has an earpiece to be used for one of the mechanical modes and another earpiece to be used for another one of the mechanical modes. The mobile communication apparatus of the second embodiment has a mouthpiece to be used for both of the mechanical modes.

Figure 6:
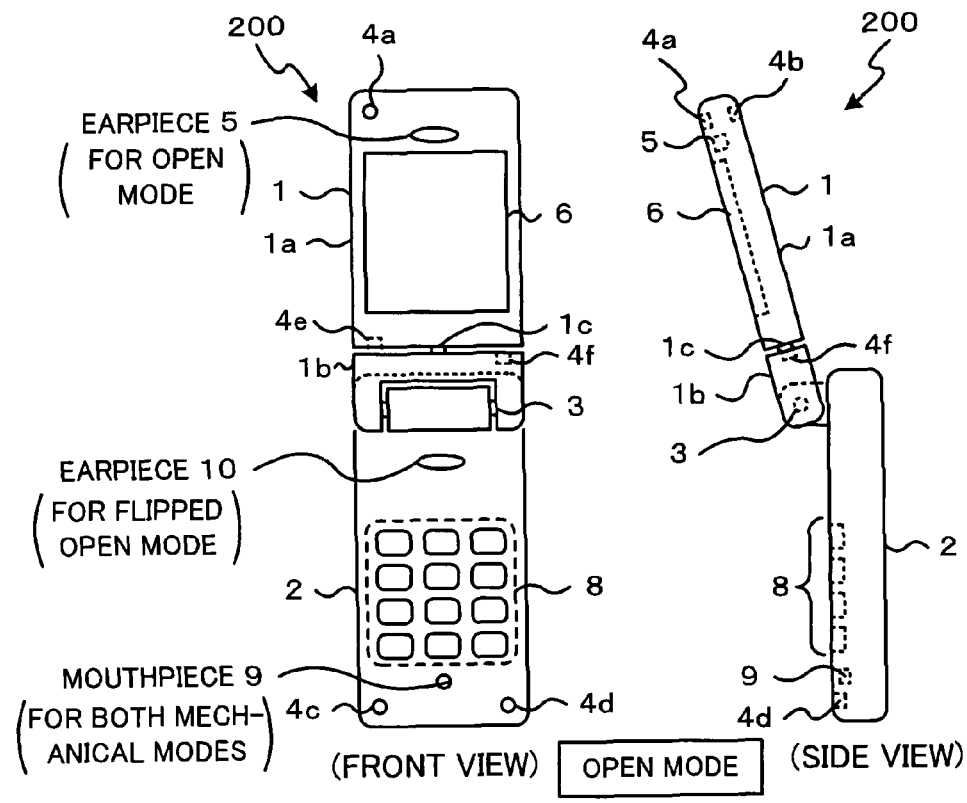
FIG. 6 shows an external view of a mobile communication apparatus of a second embodiment of the present invention in the open (ordinary mechanical) mode.

FIG. 6 shows an external view of a mobile communication apparatus 200 of the second embodiment in the ordinary mechanical mode which is essentially a same as the open mode of the first embodiment, and may also be called the open mode.

As shown in FIG. 6, each portion of the mobile communication apparatus 200 which is a same as the corresponding one of the mobile communication apparatus 100 of the first embodiment is given the same reference numeral, and its explanation is omitted.

The mobile communication apparatus 200 is different from the mobile communication apparatus 100 in that the mobile communication apparatus 200 further has a detection target (magnet) 4e in the subsection 1a of the upper section 1, and a detector 4f (Hall sensor) and an earpiece 10 in the lower section 2.

Figure 7:
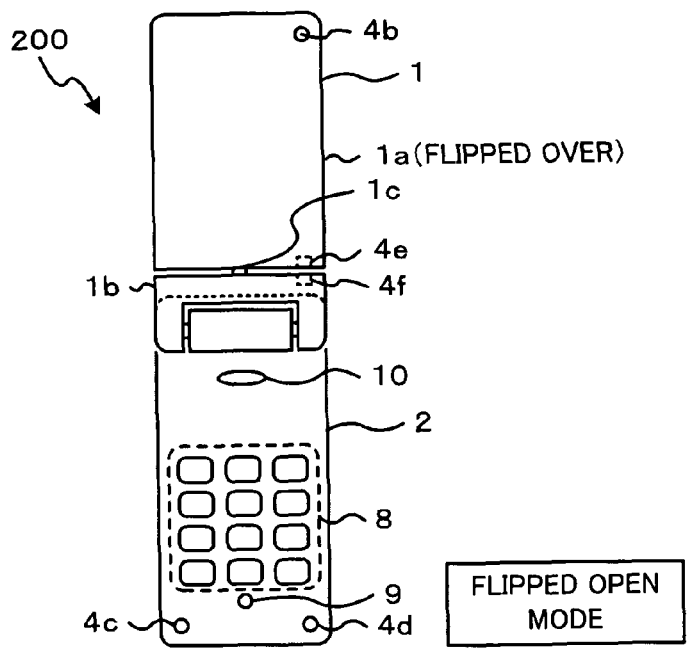
FIG. 7 shows an external view of a mobile communication apparatus of the second embodiment in a flipped open (extra mechanical) mode

As shown in FIG. 7, the mobile communication apparatus 200 may shift from the open mode to an extra mechanical mode of the second embodiment, where the subsection 1a of the upper section 1 has been flipped over around the hinge 1c while the upper section 1 and the lower section 2 remain open to each other. The extra mechanical mode shown in FIG. 7 may thus be called a flipped open mode. The detector (Hall sensor) 4f may detect the detection target (magnet) 4e coming close to the detector 4f so that the flipped open mode is detected.

In the open mode shown in FIG. 6, the mouthpiece 9 and the earpiece 5 are used for voice communication as a human audio interface. Voice communication is also available in the flipped open mode shown in FIG. 7, where the mouthpiece 9 and the earpiece 10 are used as a human audio interface. The mouthpiece 9 is used for voice communication both in the open mode and in the flipped open mode.

In a voice communication session, a spoken sound being loud enough may be picked up by the mouthpiece 9. Meanwhile, the earpiece 5, or the earpiece 10, may produce a received sound which may be conducted to and picked up by the mouthpiece 9.

In the open mode, the received sound may be conducted along an acoustic path formed by space and a housing portion between the earpiece 5 and the mouthpiece 9. In the flipped open mode, the received sound may be conducted along an acoustic path formed by space and a housing portion between the earpiece 10 and the mouthpiece 9.

As the acoustic path between the earpiece 10 and the mouthpiece 9 is shorter than the acoustic path between the earpiece 5 and the mouthpiece 9, amplitude of the received sound picked up by the mouthpiece 9 in the flipped open mode is greater than amplitude of the received sound picked up by the mouthpiece 9 in the open mode.

Figure 8:
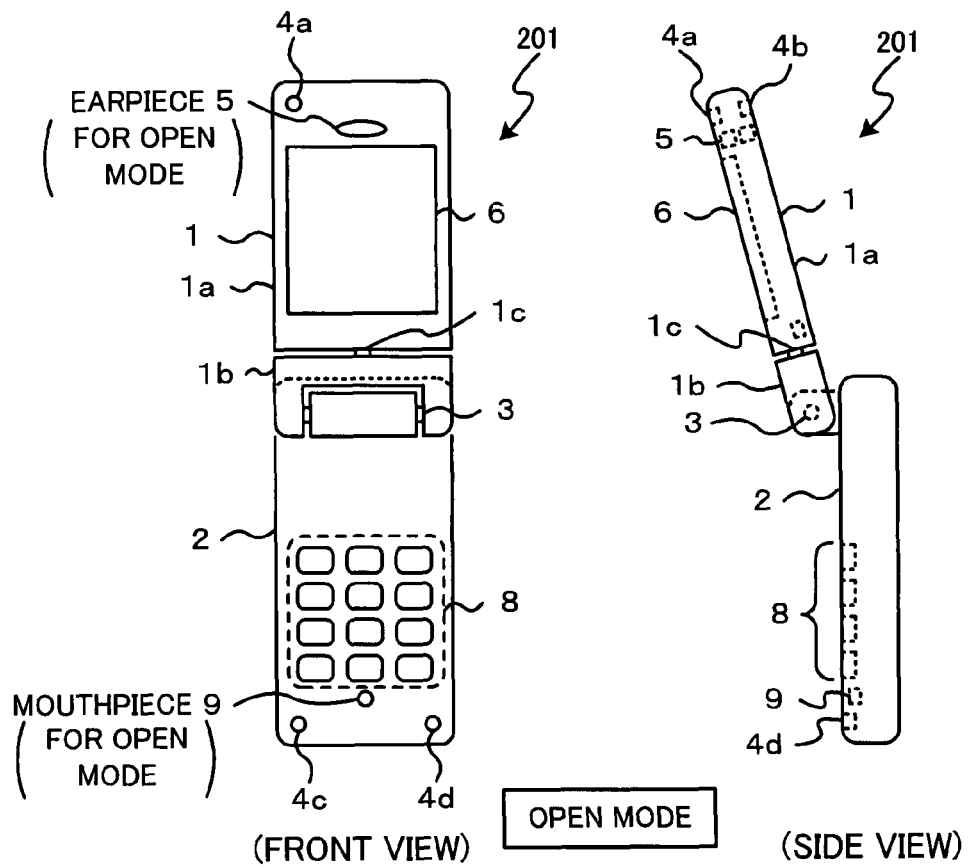
FIG. 8 shows an external view of a mobile communication apparatus of a modified second embodiment of the second embodiment in the open (ordinary mechanical) mode.

FIG. 8 shows an external view of a mobile communication apparatus 201 of a modified second embodiment in the ordinary mechanical mode which is essentially a same as the open mode of the first embodiment, and may also be called the open mode.

As shown in FIG. 8, each portion of the mobile communication apparatus 201 which is a same as the corresponding one of the mobile communication apparatus 100 is given the same reference numeral, and its explanation is omitted.

The mobile communication apparatus 201 is different from the mobile communication apparatus 100 in that the mobile communication apparatus 201 further has a mouthpiece 11 and an earpiece 12 on a back face of the subsection 1a of the upper section 1. While the mouthpiece 9 and the earpiece 5 are dedicated to the open mode, the mouthpiece 11 and the earpiece 12 are dedicated to an extra mechanical mode of the modified second embodiment.

Figure 9:
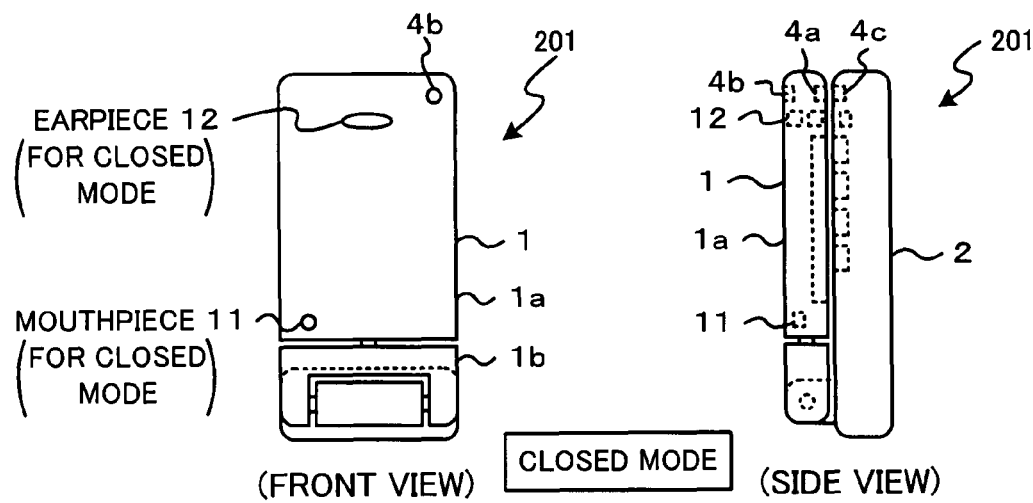
FIG. 9 shows an external view of the mobile communication apparatus of the modified second embodiment in a closed (extra mechanical) mode.

FIG. 9 shows an external view of the mobile communication apparatus 201 in the extra mechanical mode of the modified second embodiment, where the upper section 1 and the lower section 2 are closed to each other while the display 6 is facing the user controls 8. As the upper section 1 and the lower section 2 have been simply folded and closed to each other, the extra mechanical mode shown in FIG. 9 may be called a closed mode.

The mobile communication apparatus 201 may shift from the open mode shown in FIG. 8 to the closed mode shown in FIG. 9 by folding the upper section 1, like pulling up first and then pushing down to the lower section 2 around the hinge 3.

In the closed mode, the mouthpiece 11 and the earpiece 12 are exposed outwards. The detector (Hall sensor) 4c detects the detection target (magnet) 4a coming close to the detector 4c so that the closed mode is detected.

In the open mode, the mouthpiece 9 and the earpiece 5 are used for voice communication as a human audio interface. Voice communication is also available in the closed mode, where the mouthpiece 11 and the earpiece 12 are used as a human audio interface.

In a voice communication session, a spoken sound being loud enough may be picked up by the mouthpiece 9 or the mouthpiece 11. Meanwhile, the earpiece 5 may produce a received sound which may be conducted to and picked up by the mouthpiece 9, and the earpiece 12 may produce a received sound which may be conducted to and picked up by the mouthpiece 11.

In the open mode, the received sound may be conducted along an acoustic path formed by space and a housing portion between the earpiece 5 and the mouthpiece 9. In the closed mode, the received sound may be conducted along an acoustic path formed by space and a housing portion between the earpiece 12 and the mouthpiece 11.

As the acoustic path between the earpiece 12 and the mouthpiece 11 is shorter than the acoustic path between the earpiece 5 and the mouthpiece 9, amplitude of the received sound picked up by the mouthpiece 11 in the closed mode is greater than amplitude of the received sound picked up by the mouthpiece 9 in the open mode.

Figure 10:
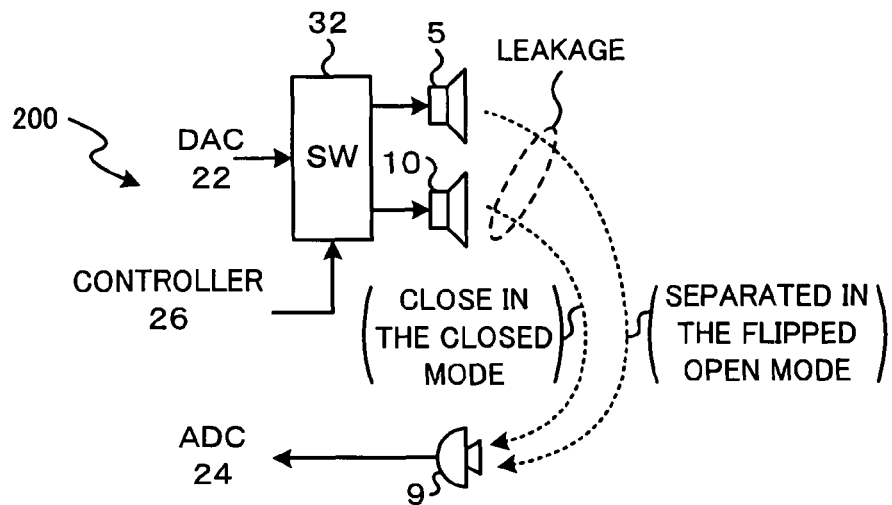
FIG. 10 is a partial block diagram of the mobile communication apparatus of the second embodiment, focusing on differences from the first embodiment.
Figure 11:
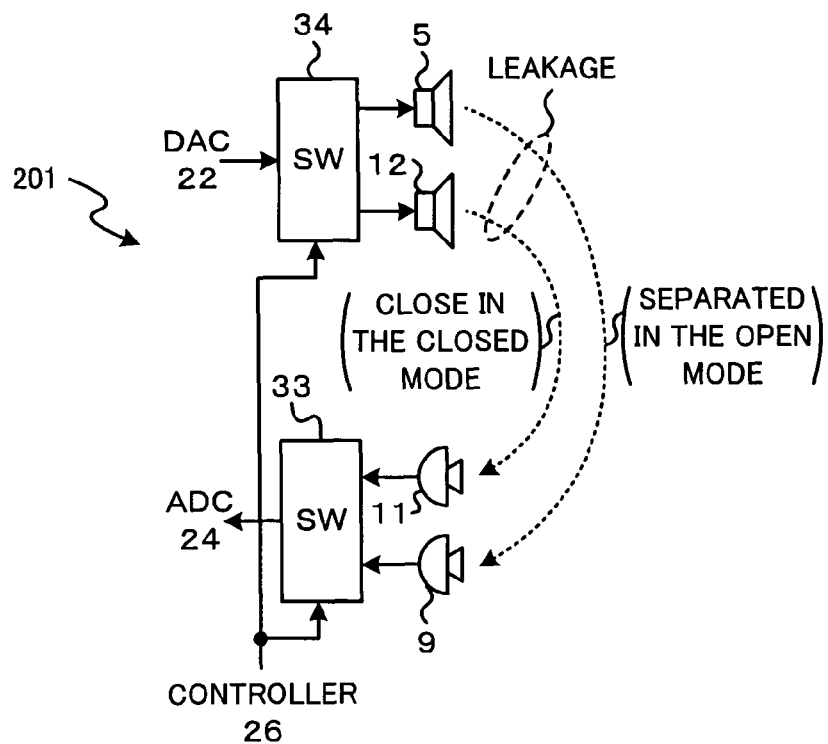
FIG. 11 is a partial block diagram of the mobile communication apparatus of the modified second embodiment, focusing on differences from the first embodiment.

FIG. 10 is a partial block diagram of the mobile communication apparatus 200 of the second embodiment, focusing on differences from the first embodiment. FIG. 11 is a partial block diagram of the mobile communication apparatus 201 of the modified second embodiment, focusing on differences from the first embodiment.

As shown in FIG. 10 and in FIG. 6, the mobile communication apparatus 200 has the earpiece 5 and the earpiece 10 to be used in the open mode and in the flipped open mode, respectively, and the mouthpiece 9 to be used both in the open mode and the flipped open mode.

As shown in FIG. 10, the mobile communication apparatus 200 further includes a switch 32 for switching between the earpiece 5 and the earpiece 10, instead of the switch 23 for switching between the two mouthpieces shown in FIG. 3 of the first embodiment. A rest of the mobile communication apparatus 200 which is not shown in FIG. 10 is a same as the corresponding one of the mobile communication apparatus 100 shown in FIG. 3, except for the detectors.

As shown in FIG. 11 and in FIG. 8, the mobile communication apparatus 201 has the mouthpiece 9 and the earpiece 5 to be used in the open mode, and has the mouthpiece 11 and the earpiece 12 to be used in the closed mode.

As shown in FIG. 11, the mobile communication apparatus 201 further includes a switch 33 for switching between the mouthpiece 9 and the mouthpiece 11, and includes a switch 34 for switching between the earpiece 5 and the earpiece 12. A rest of the mobile communication apparatus 201 which is not shown in FIG. 11 is a same as the corresponding one of the mobile communication apparatus 100 shown in FIG. 3.

Figure 12:
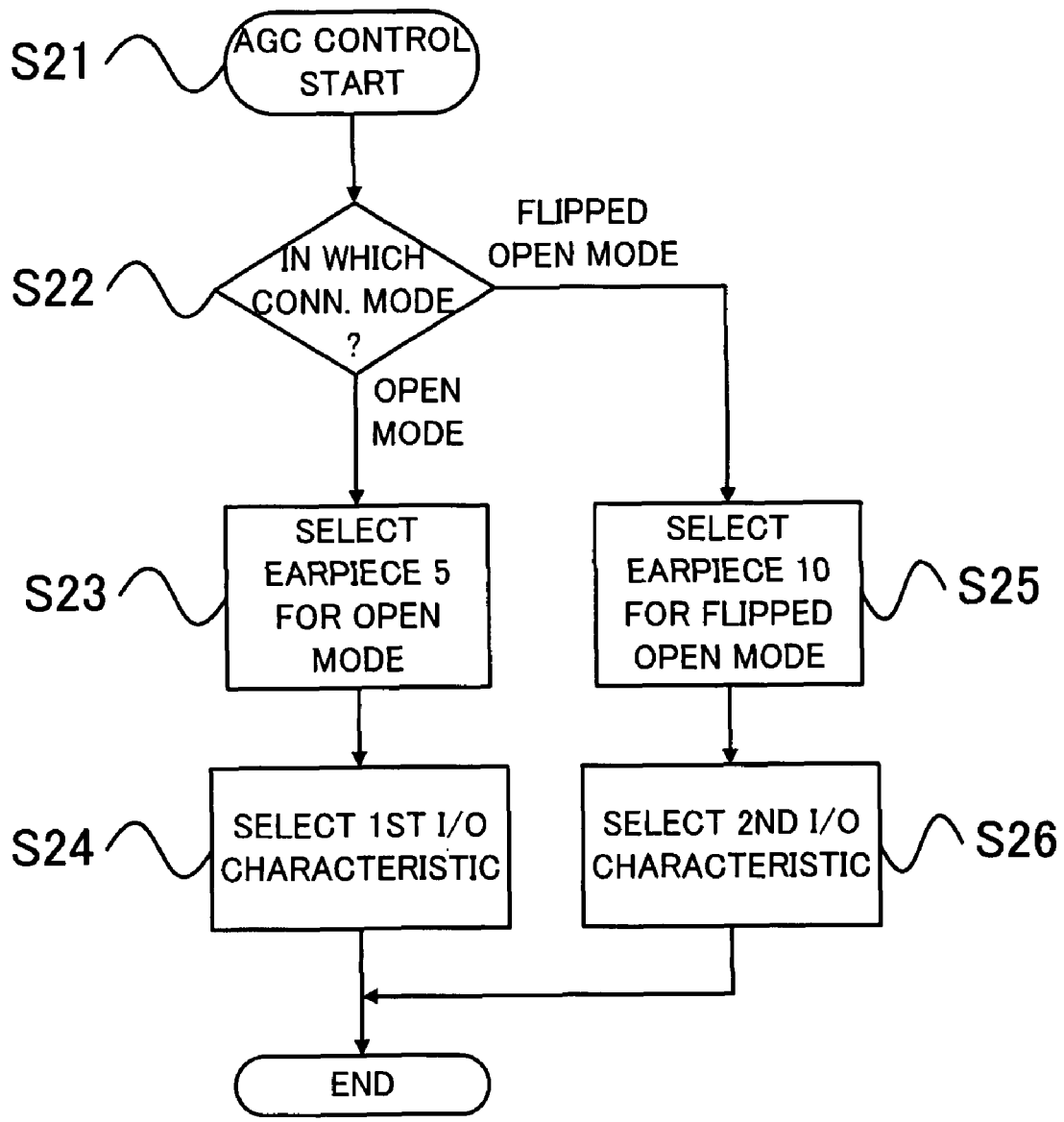
FIG. 12 is a flow chart of operation of a controller included in the mobile communication apparatus of the second embodiment.

FIG. 12 is a flow chart of operation of the controller 26 included in the mobile communication apparatus 200 of the second embodiment. After starting AGC control operation (step S21), the controller 26 checks if the mobile communication apparatus 200 is in the open mode or in the flipped open mode by checking status of the detectors 4c, 4d and 4f (step S22).

In the open mode, the controller 26 selects the earpiece 5 by selecting the changeover of the switch 32, as the mouthpiece 9 and the earpiece 5 are used for voice communication in the open mode (step S23). The controller 26 then provides the AGC 25 with the first I/O characteristic (step S24).

In the flipped open mode, the controller 26 selects the earpiece 10 by selecting the changeover of the switch 32 (step S25), as the mouthpiece 9 and the earpiece 10 are used for voice communication in the flipped open mode. The controller 26 then provides the AGC 25 with the second I/O characteristic (step S26).

Figure 13:
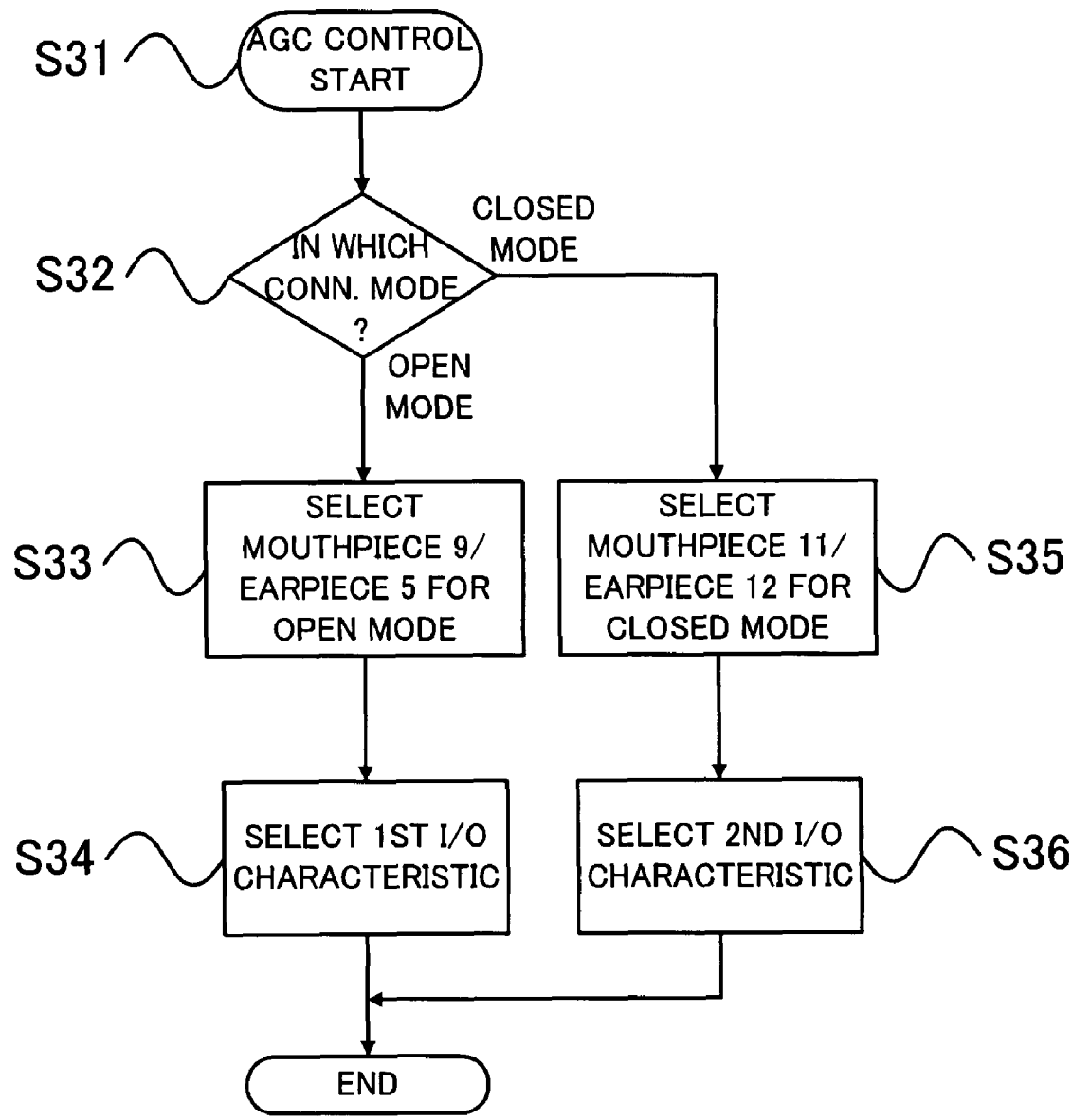
FIG. 13 is a flow chart of operation of a controller included in the mobile communication apparatus of the modified second embodiment.

FIG. 13 is a flow chart of operation of the controller 26 included in the mobile communication apparatus 201 of the modified second embodiment. After starting AGC control operation (step S31), the controller 26 checks if the mobile communication apparatus 201 is in the open mode or in the closed mode by checking status of the detectors 4c and 4d (step S32).

In the open mode, the controller 26 selects the mouthpiece 9 and the earpiece 5 by selecting the changeover of the switches 33 and 34, as the mouthpiece 9 and the earpiece 5 are used for voice communication in the open mode (step S33). The controller 26 then provides the AGC 25 with the first I/O characteristic (step S34).

In the closed mode, the controller 26 selects the mouthpiece 11 and the earpiece 12 by selecting the changeover of the switches 33 and 34 (step S35), as the mouthpiece 11 and the earpiece 12 are used for voice communication in the closed mode. The controller 26 then provides the AGC 25 with the second I/O characteristic (step S36).

According to the second embodiment and the modified second embodiment of the present invention described above, the mobile communication apparatus 200 or 201 may be used for voice communication in the ordinary mechanical mode and in the extra mechanical mode which is different from that of the first embodiment. The mobile communication apparatus 200 or 201 includes the AGC 25 following the echo canceller 21 on the signal path of the spoken sound. The AGC 25 may be selectively provided with one of the plural I/O characteristics according to one of the mechanical modes so that the echo may be effectively cancelled.

A third embodiment of the present invention will be described with reference to FIGS. 14-16, as to a mobile communication apparatus configured to be used for two types of voice communication, i.e., handheld and hands-free, and configured to select an I/O characteristic of AGC accordingly.

Figure 14:
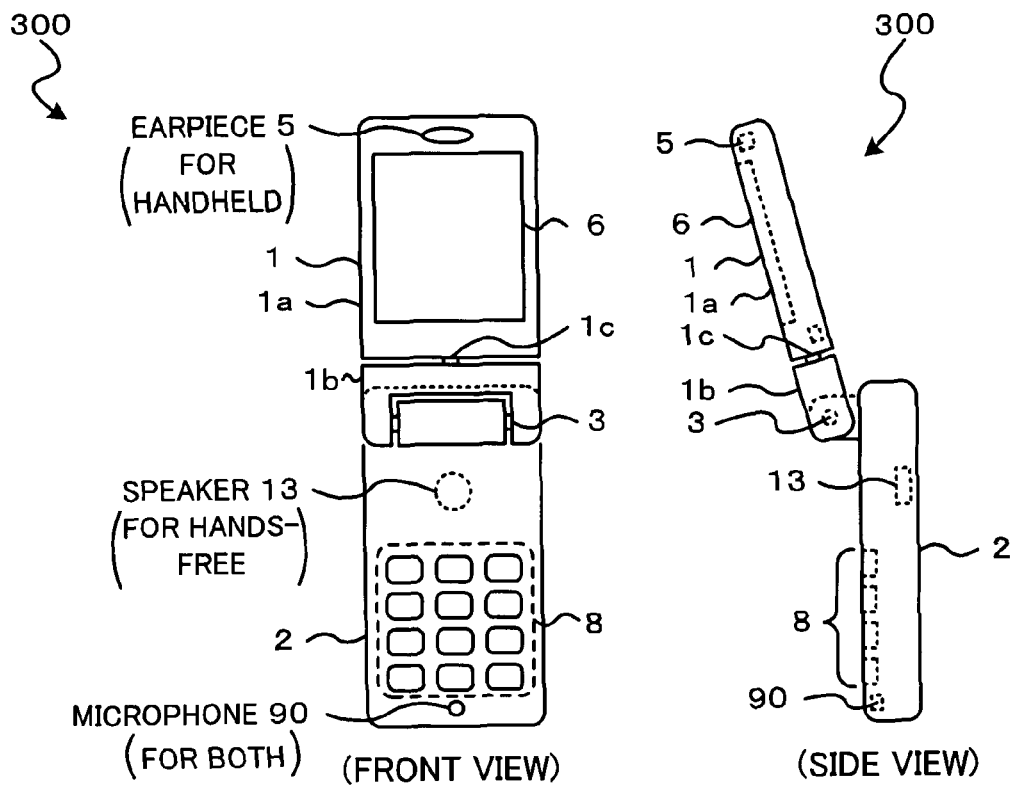
FIG. 14 shows an external view of the mobile communication apparatus of a third embodiment of the present invention.

FIG. 14 shows an external view of a mobile communication apparatus 300 of the third embodiment. As shown in FIG. 14, each portion of the mobile communication apparatus 300 which is a same as the corresponding one of the mobile communication apparatus 100 of the first embodiment is given the same reference numeral, and its explanation is omitted.

The mobile communication apparatus 300 is different from the mobile communication apparatus 100 in that the mobile communication apparatus 300 further has a speaker 13 in the lower section 2, and has a microphone 90 in the lower section 2 instead of the mouthpiece 9. The microphone 90 and the earpiece 5 may be used for the handheld voice communication. The microphone 90 and the speaker 13 may be used for the hands-free voice communication. The microphone 90 may be used for both types of the voice communication.

Amplitude of a received sound produced by the speaker 13 should be greater than that produced by the earpiece 5, as a user is usually somewhat remote from the mobile communication apparatus 300 for the hands-free voice communication. Sensitivity of the microphone 90 for the hands-free voice communication should be set higher than that for the handheld voice communication.

Leakage of a received sound from the speaker 13 to the microphone 90 may thereby be greater than that from the earpiece 5 to the microphone 90. The speaker 13 may be located in the upper section 1, but the above leakage may still remain significant even in such a case. As shown in FIG. 14, the speaker 13 and the microphone 90 may be directed opposite to each other so as to reduce the leakage, but the above leakage may still remain significant even in such a case.

Figure 15:
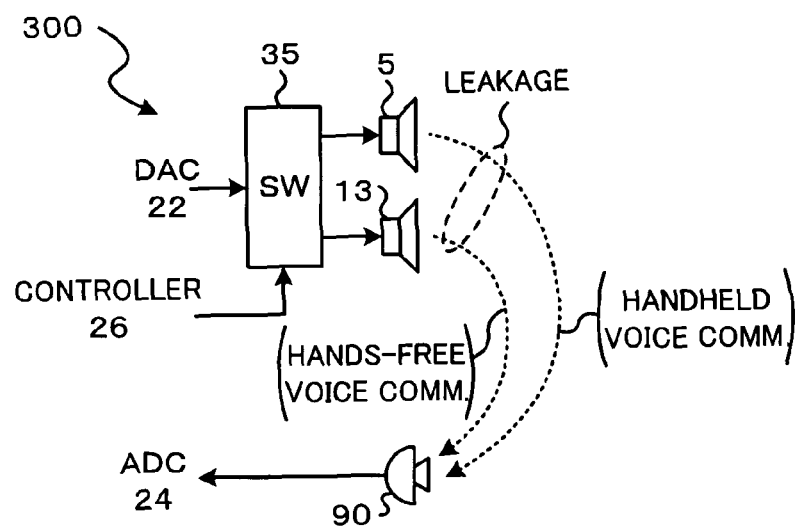
FIG. 15 is a partial block diagram of the mobile communication apparatus of the third embodiment, focusing on differences from the first embodiment.

FIG. 15 is a partial block diagram of the mobile communication apparatus 300 of the third embodiment, focusing on differences from the first embodiment. As shown in FIG. 15 and in FIG. 14, the mobile communication apparatus 300 has the earpiece 5 to be used only for the handheld voice communication, the speaker 13 to be used only for the hands-free voice communication, and the microphone 90 to be used for both types of the voice communication.

The mobile communication apparatus 300 has a switch 35 for switching between the earpiece 5 and the speaker 13. A rest of the mobile communication apparatus 300 which is not shown in FIG. 15 is a same as the corresponding one of the mobile communication apparatus 100 shown in FIG. 3.

Figure 16:
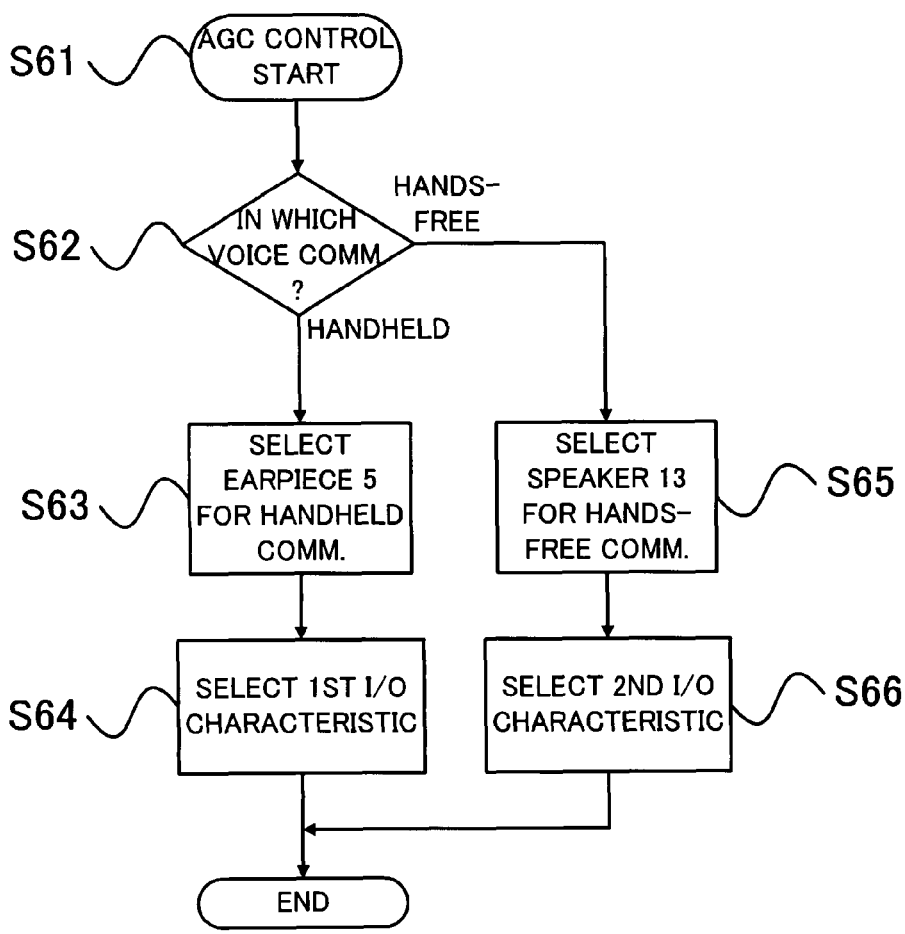
FIG. 16 is a flow chart of operation of a controller included in the mobile communication apparatus of the third embodiment.

FIG. 16 shows a flow chart of operation of the controller 26 of the third embodiment. The controller 26 may control the AGC function according to the type of the voice communication. After starting AGC control operation (step S61), the controller 26 checks if the mobile communication apparatus 300 is used for the handheld voice communication or for the hands-free voice communication (step S62).

In case of the handheld voice communication, the controller 26 selects the earpiece 5 by selecting the changeover of the switch 35 (step S63), as the microphone 90 and the earpiece 5 are used for the handheld voice communication. The controller 26 then provides the AGC 25 with the first I/O characteristic (step S64).

In case of the hands-free voice communication, the controller 26 selects the speaker 13 by selecting the changeover of the switch 35 (step S65), as the microphone 90 and the speaker 13 are used for the hands-free voice communication. The controller 26 then provides the AGC 25 with the second I/O characteristic (step S66), which has been shown in FIG. 4 of the first embodiment and may also be applied for echo cancellation of the hands-free voice communication.

According to the third embodiment of the present invention described above, the mobile communication apparatus 300 that may be used for the two types, handheld and hands-free, of voice communication includes the AGC 25 following the echo canceller 21 on the signal path of the spoken sound. The AGC 25 may be selectively provided with one of the plural I/O characteristics according to one of the type of the voice communication so that the echo may be effectively cancelled.

A fourth embodiment of the present invention and a modified one thereof will be described with reference to FIGS. 17-19, as to mobile communication apparatus mechanically configured to reduce leakage of a received sound so as to cancel an echo.

Figure 17:
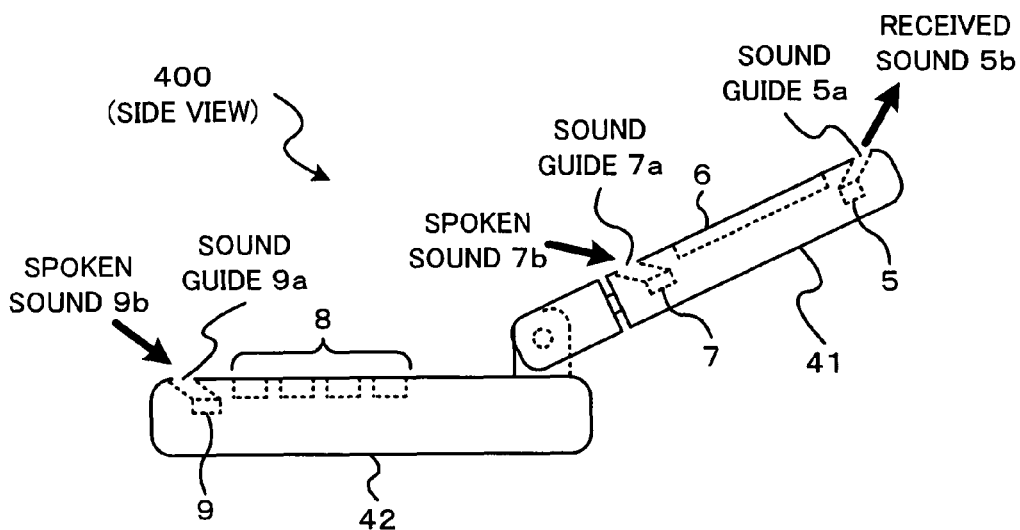
FIG. 17 shows a side view of a mobile communication apparatus of a fourth embodiment of the present invention.

FIG. 17 shows a side view of a mobile communication apparatus 400 of the fourth embodiment of the present invention. As shown in FIG. 17, each portion of the mobile communication apparatus 400 which is a same as the corresponding one of the mobile communication apparatus 100 of the first embodiment is given the same reference numeral, and its explanation is omitted. The mobile communication apparatus 400 includes an upper section 41 and a lower section 42 which are movably connected to each other.

The lower section 42 has a tube-shaped sound guide 9a that may work as a guide path of a spoken sound 9b picked up by the mouthpiece 9. The mouthpiece 9 thereby has sound directivity in a direction of the tube of the sound guide 9a, or of the spoken sound 9b shown by a bold arrow in FIG. 17.

The upper section 41 has a tube-shaped sound guide 7a that may work as a guide path of a spoken sound 7b picked up by the mouthpiece 7. The mouthpiece 7 thereby has sound directivity in a direction of the tube of the sound guide 7a, or of the spoken sound 7b shown by a bold arrow in FIG. 17.

The upper section 41 has a tube-shaped sound guide 5a that may work as a guide path of a received sound 5b produced by the earpiece 5. The earpiece 5 thereby has sound directivity in a direction of the tube of the sound guide 5a, or of the received sound 5b shown by a bold arrow in FIG. 17.

The mouthpiece 9 and the earpiece 5 are used for voice communication while the upper section 41 and the lower section 42 are being open to each other. The received sound 5b produced by the earpiece 5 is directed differently from the spoken sound 9b picked up by the mouthpiece 9. Leakage of the received sound 5b into the mouthpiece 9 may thereby be reduced.

The mouthpiece 7 and the earpiece 5 are used for voice communication while the upper section 41 and the lower section 42 are being closed to each other. The received sound 5b produced by the earpiece 5 is directed differently from the spoken sound 7b picked up by the mouthpiece 7. Leakage of the received sound 5b into the mouthpiece 7 may thereby be reduced.

As shown in FIG. 17, the sound guide 9a directed opposite of the bold arrow of 9b and the sound guide 5a directed toward the bold arrow of 5b are directed separate to each other. Similarly, the sound guide 7a directed opposite of the bold arrow of 7b and the sound guide 5a directed toward the bold arrow of 5b are directed separate to each other. This mechanical configuration may contribute to reducing the above leakage.

Figure 18:
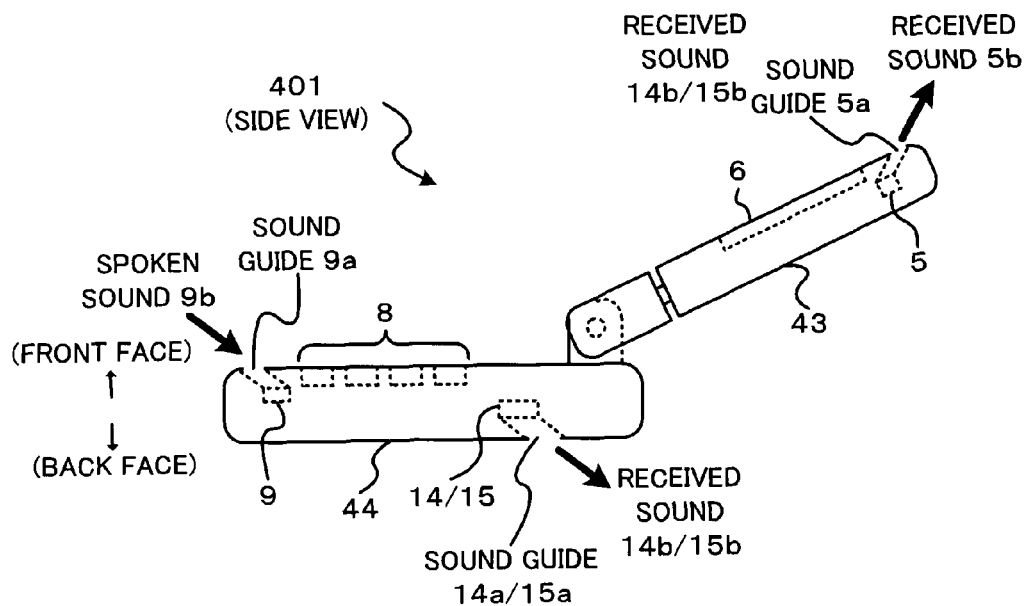
FIG. 18 shows a side view of a mobile communication apparatus of a modified fourth embodiment of the present invention.

FIG. 18 shows a side view of a mobile communication apparatus 401 of a modified fourth embodiment of the present invention. FIG. 19 shows a front view of the mobile communication apparatus 401. As shown in FIG. 18 or FIG. 19, each portion of the mobile communication apparatus 401 which is a same as the corresponding one of the mobile communication apparatus 400 is given the same reference numeral, and its explanation is omitted. The mobile communication apparatus 401 includes an upper section 43 and a lower section 44 which are movably connected to each other.

The lower section 44 has a speaker 14 and a speaker 15 for producing received sounds. The lower section 44 has a tube-shaped sound guide 14a that may work as a guide path of a received sound 14b produced by the speaker 14. The lower section 44 has a tube-shaped sound guide 15a that may work as a guide path of a received sound 15b produced by the speaker 15.

The received sound 14b produced by the speaker 14 is directed differently from the spoken sound 9b picked up by the mouthpiece 9. The received sound 15b produced by the speaker 15 is directed differently from the spoken sound 9b picked up by the mouthpiece 9.

As shown in FIG. 18, the sound guide 14a directed toward the bold arrow of 14b may be directed toward a back face of the lower section 44. Similarly, the sound guide 15a directed toward the bold arrow of 15b may be directed toward the back face of the lower section 44.

Figure 19:
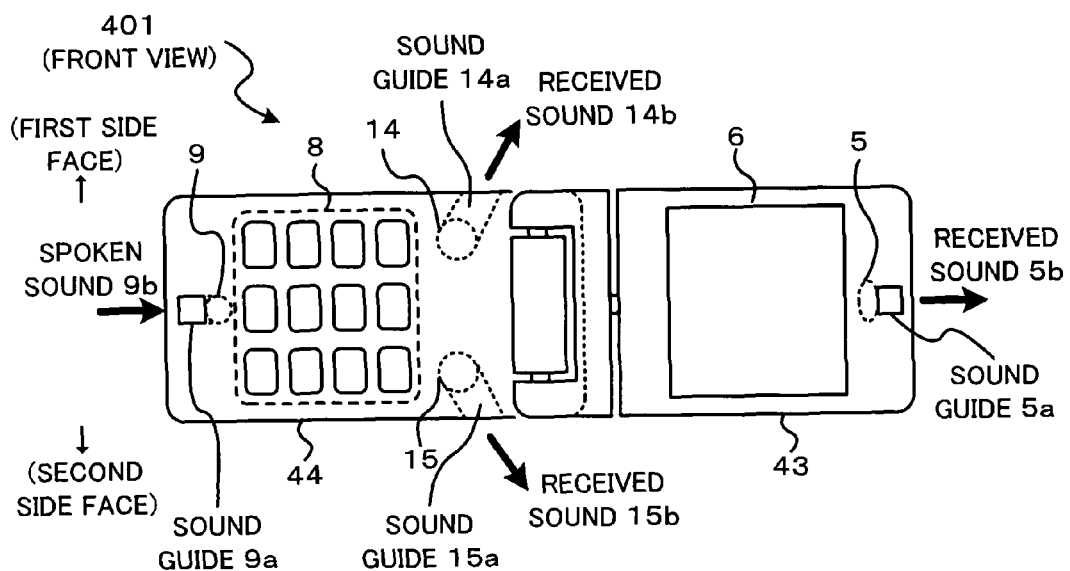
FIG. 19 shows a front view of the mobile communication apparatus of the modified fourth embodiment.

As shown in FIG. 19, the sound guide 14a directed toward the bold arrow of 14b may be directed toward a first side face of the lower section 44. Similarly, the sound guide 15a directed toward the bold arrow of 15b may be directed toward a second side face of the lower section 44.

As shown in FIG. 18 or FIG. 19, the sound guide 14a directed toward the bold arrow of 14b and the sound guide 9a directed opposite of the bold arrow of 9b are directed separate to each other. Similarly, the sound guide 15a directed toward the bold arrow of 15b and the sound guide 9a directed opposite of the bold arrow of 9b are directed separate to each other. This mechanical configuration may contribute to reducing leakage of the received sound 14b or 15b into the mouthpiece 9.

According to the fourth embodiment of the present invention described above, the mobile communication apparatus is provided with a tube-shaped sound guide for each of the mouthpiece, the earpiece and the speaker. The sound guide of the mouthpiece and the sound guide of the earpiece (or of the speaker) are directed separate to each other so that leakage of a sound from the earpiece (or from the speaker) to the mouthpiece may be reduced.

As described with respect to the first to the third embodiments, it has been assumed that a pair of the mouthpiece and the earpiece for one mechanical mode (or for handheld voice communication) is different from a pair of the mouthpiece and the earpiece (or the speaker) for another mechanical mode (or for hands-free voice communication).

The present invention may not be limited by the above assumption. For instance, a mobile communication apparatus may be provided with one speaker that may be used both for handheld voice communication and for hands-free voice communication. The mobile communication apparatus may select one of the plural I/O characteristics of the AGC function according to the handheld voice communication for which the speaker is muted, or according to the hands-free voice communication for which the speaker is driven with much power.

The present invention may not be limited to a mobile communication apparatus having a double swivel structure, but may be applied to one having another type of structure connecting plural sections. Examples of such a structure are disclosed, e.g., in Japanese Patent Publication (Kokai), No. 2005-214900, paragraph "0003" and FIG. 3 (clamshell), paragraph "0037" and FIG. 4 (turnover).

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. A mobile communication apparatus usable for voice communication exchanging a received sound and a spoken sound, comprising: a first section; a second section movably connected to the first section in at least one of an ordinary mechanical mode and an extra mechanical mode;
   a detector configured to detect one of the ordinary mechanical mode and the extra mechanical mode; a speaker included in the first section and configured to produce the received sound; a microphone included in the second section and configured to pick up the spoken sound; an echo canceller configured to cancel an echo caused by leakage of the received sound into the microphone upon being provided with a signal of the spoken sound and a signal of the received sound, thereby producing an echo cancelled signal obtained by subtracting a signal of the echo from the signal of the spoken sound;
   an automatic gain control (AGC) circuit configured to receive the echo cancelled signal from the echo canceller to produce a gain-controlled signal based on the echo cancelled signal; and a controller configured to provide the AGC circuit with a first input/output characteristic and a second input/output characteristic in the ordinary mechanical mode and in the extra mechanical mode, respectively,
   wherein the second input/output characteristic is characterized by providing lower output than the first input/output characteristic in a relatively lower input level of the echo cancelled signal and by providing the same output as the first input/output characteristic in input levels other than the relatively lower input level of the echo cancelled signal.

2. The mobile communication apparatus of claim 1, further comprising: an additional microphone included in the first section, and a selector configured to select one of the microphone and the additional microphone to provide the echo canceller with the signal of the spoken sound in the ordinary mechanical mode and in the extra mechanical mode, respectively.

3. The mobile communication apparatus of claim 1, further comprising: an additional microphone included in the first section; and a selector configured to select one of the microphone and the additional microphone to provide the echo canceller with the signal of the spoken sound in the ordinary mechanical mode and in the extra mechanical mode, respectively,
   wherein an acoustic path formed between the speaker and the additional microphone in the extra mechanical mode is shorter than an acoustic path formed between the speaker and the microphone in the ordinary mechanical mode.

4. The mobile communication apparatus of claim 1, further comprising: an additional speaker included in the second section; and a selector configured to select one of the speaker and the additional speaker to produce the received sound in the ordinary mechanical mode and in the extra mechanical mode, respectively.

5. The mobile communication apparatus of claim 1, further comprising: an additional speaker included in the second section; and a selector configured to select one of the speaker and the additional speaker to produce the received sound in the ordinary mechanical mode and in the extra mechanical mode, respectively, wherein an acoustic path formed between the additional speaker and the microphone in the extra mechanical mode is shorter than an acoustic path formed between the speaker and the microphone in the ordinary mechanical mode.

6. The mobile communication apparatus of claim 1, further comprising: an additional microphone included in one of the first section and the second section; an additional speaker included in one of the first section and the second section including the additional microphone;
   a first selector configured to select one of the microphone and the additional microphone to provide the echo canceller with the signal of the spoken sound in the ordinary mechanical mode and in the extra mechanical mode, respectively; and a second selector configured to select one of the speaker and the additional speaker to produce the received sound in the ordinary mechanical mode and in the extra mechanical mode, respectively.

7. The mobile communication apparatus of claim 1,
further comprising an additional microphone included in one of the first section and the second section; an additional speaker included in said one of the first section and the second section including the additional microphone; a first selector configured to select one of the microphone and the additional microphone to provide the echo canceller with the signal of the spoken sound in the ordinary mechanical mode and in the extra mechanical mode, respectively; and a second selector configured to select one of the speaker and the additional speaker to produce the received sound in the ordinary mechanical mode and in the extra mechanical mode, respectively, wherein an acoustic path formed between the additional speaker and the additional microphone in the extra mechanical mode is shorter than an acoustic path formed between the speaker and the microphone in the ordinary mechanical mode.

8. A mobile communication apparatus usable for handheld or hands-free voice communication exchanging a received sound and a spoken sound, comprising: a first speaker configured to produce the received sound for the handheld voice communication; a second speaker configured to produce the received sound for the hands-free voice communication; a microphone configured to pick up the spoken sound; an echo canceller configured to cancel an echo caused by leakage of the received sound into the microphone upon being provided with a signal of the received sound and a signal of the spoken sound, thereby producing an echo cancelled signal obtained by subtracting a signal of the echo from the signal of the spoken sound; an automatic gain control (AGC) circuit configured to receive the echo cancelled signal from the echo canceller to produce a gain-controlled signal based on the echo cancelled signal; and a controller configured to provide the AGC circuit with a first input/output characteristic and a second input/output characteristic for the handheld voice communication and for the hands-free voice communication, respectively, wherein the second input/output characteristic is characterized by providing lower output than the first input/output characteristic in a relatively lower input level of the echo cancelled signal and by providing the same output as the first input/output characteristic in input levels other than the relatively lower input level of the echo cancelled signal.

9. The mobile communication apparatus of claim 8, wherein the second speaker and the microphone are directed opposite to each other.

10. The mobile communication apparatus of claim 8, wherein an acoustic path formed between the second speaker and the microphone while being used for the hands-free voice communication is shorter than an acoustic path formed between the first speaker and the microphone while being used for the handheld voice communication.

* * * * *